(12) United States Patent
Reddy et al.

(10) Patent No.: US 9,445,149 B2
(45) Date of Patent: *Sep. 13, 2016

(54) METHOD AND APPARATUS FOR BAND SEPARATION FOR MULTIBAND COMMUNICATION SYSTEMS

(71) Applicant: MaxLinear, Inc., Carlsbad, CA (US)

(72) Inventors: Madhukar Reddy, Carlsbad, CA (US); Timothy Gallagher, Encinitas, CA (US)

(73) Assignee: Maxlinear, Inc., Carlsbad, CA (US)

( * ) Notice: Subject to any disclaimer, the term of this patent is extended or adjusted under 35 U.S.C. 154(b) by 229 days.

This patent is subject to a terminal disclaimer.

(21) Appl. No.: 14/230,058

(22) Filed: Mar. 31, 2014

(65) Prior Publication Data

US 2014/0298396 A1    Oct. 2, 2014

Related U.S. Application Data

(63) Continuation of application No. 13/301,102, filed on Nov. 21, 2011, now Pat. No. 8,687,478.

(51) Int. Cl.
| | |
|---|---|
| H04J 1/12 | (2006.01) |
| H04B 7/216 | (2006.01) |
| H04L 12/28 | (2006.01) |
| H03H 7/30 | (2006.01) |
| H04N 21/4385 | (2011.01) |
| H04N 21/61 | (2011.01) |

(52) U.S. Cl.
CPC ...... *H04N 21/4385* (2013.01); *H04L 12/2801* (2013.01); *H04N 21/6118* (2013.01); *H04N 21/6168* (2013.01)

(58) Field of Classification Search
CPC ............... H04N 21/4385; H04N 21/6118; H04N 21/6168; H04L 12/2801
See application file for complete search history.

(56) References Cited

U.S. PATENT DOCUMENTS

| | | | |
|---|---|---|---|
| 8,085,802 B1 * | 12/2011 | Monk et al. .................. | 370/419 |
| 2006/0018289 A1 | 1/2006 | Schulist et al. | |
| 2011/0292989 A1 * | 12/2011 | Nguyen et al. ............... | 375/229 |

* cited by examiner

*Primary Examiner* — Kiet G Tang
(74) *Attorney, Agent, or Firm* — McAndrews, Held & Malloy

(57) ABSTRACT

Aspects of a method and apparatus for band separation for multiband communication systems are provided. One or more circuits for use in a transceiver may comprise a triplexer and a leakage processing module. The triplexer may comprise a multiband port, a Multimedia Over Coaxial Alliance (MoCA) port, a television upstream port, and a television downstream port. The leakage processing module may comprise a television downstream input port, a cable television downstream output port, a MoCA port, and a cable television upstream port. The leakage processing module may be operable to (1) process a MoCA signal to generate a first compensation signal; (2) process a cable upstream signal to generate a second compensation signal; (3) process a filtered signal based at least in part on the first and second compensation signals; and (4) output the processed filtered signal via the cable television downstream output port of said leakage processing module.

18 Claims, 15 Drawing Sheets

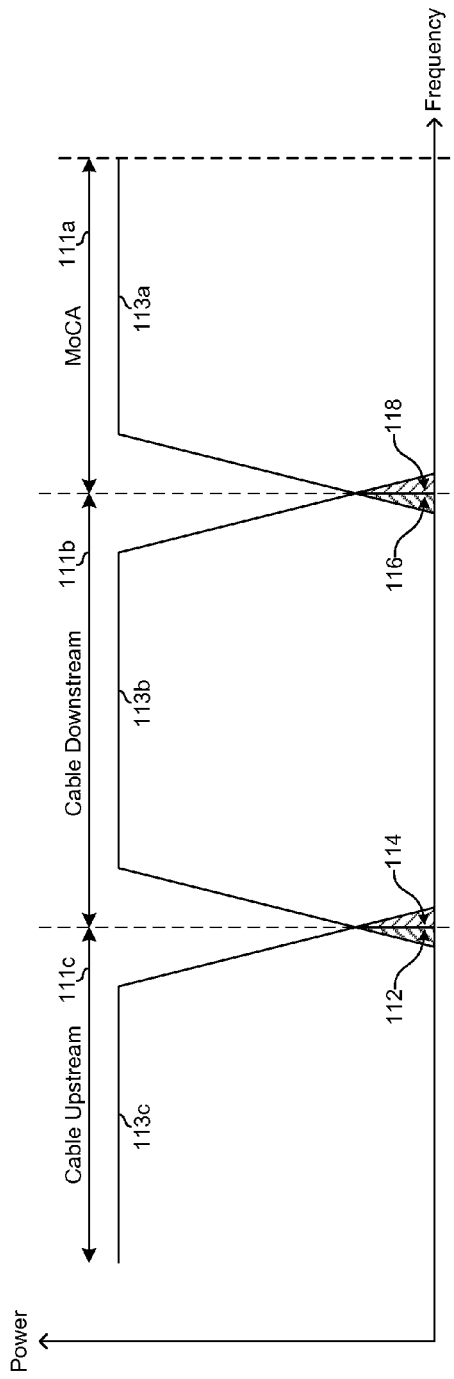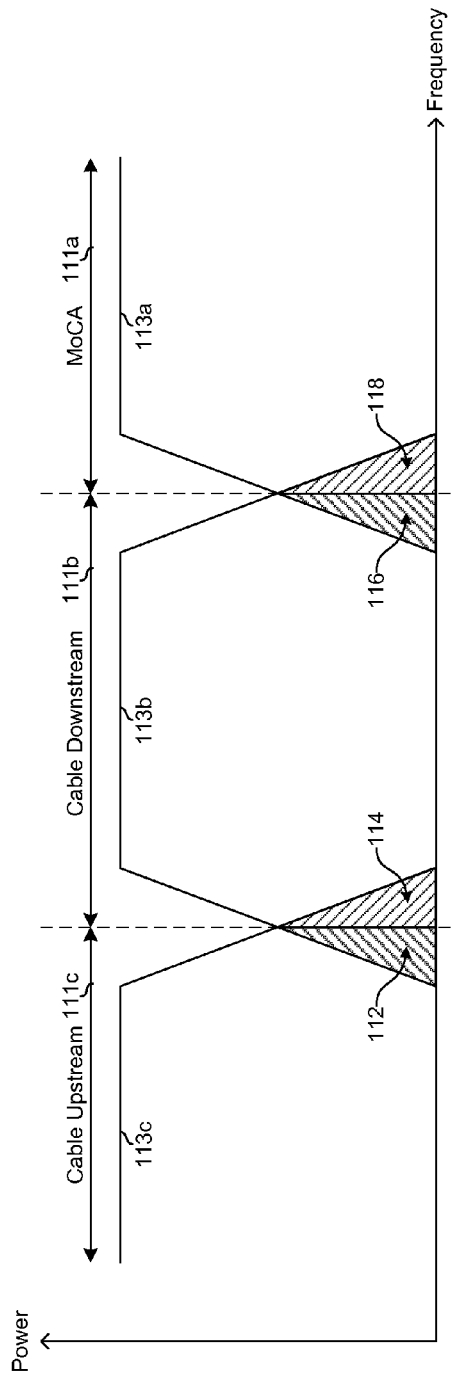

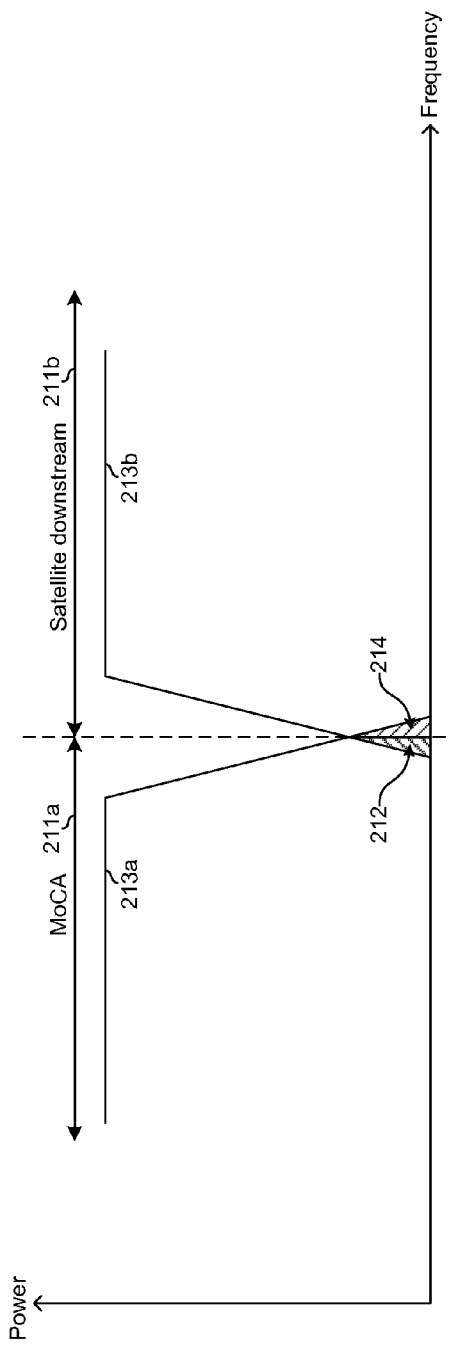
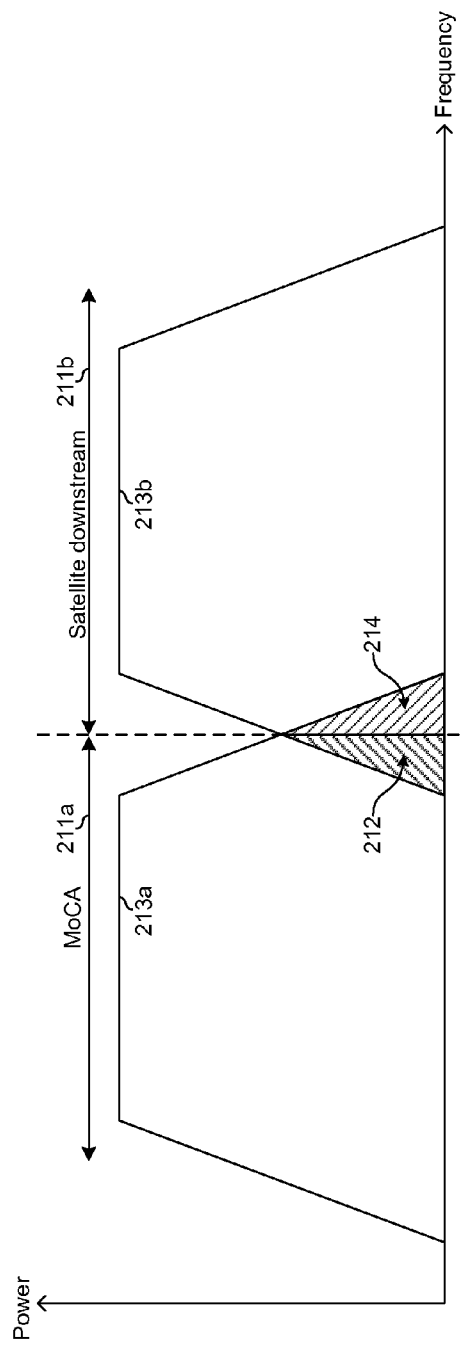

METHOD AND APPARATUS FOR BAND SEPARATION FOR MULTIBAND COMMUNICATION SYSTEMS

CLAIM OF PRIORITY

This patent application is a continuation of U.S. application Ser. No. 13/301,102, filed Nov. 21, 2011, U.S. Pat. No. 8,687,478.

FIELD OF THE INVENTION

Certain embodiments of the invention relate to multiband communication systems. More specifically, certain embodiments of the invention relate to a method and apparatus for band separation in multiband communication systems.

BACKGROUND OF THE INVENTION

Frequency division multiplexing enables the concurrent communication of multiple signals over the same physical medium. In a frequency division multiplexed system, signals are frequency-converted to an assigned frequency band prior to being transmitted over the physical medium. To enable recovering the signals at the receiver, each of the different signals is assigned to a different frequency band or bands. The receiver then separates the received composite signal into the various frequency bands, and then processes the signal received in one or more of the assigned frequency bands to recover the information contained in that signal. Conventional circuitry utilized for separating the frequency bands, however, is costly.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for band separation in multiband communication systems, substantially as illustrated by and/or described in connection with at least one of the figures, as set forth more completely in the claims.

These and other advantages, aspects and novel features of the present invention, as well as details of an illustrated embodiment thereof, will be more fully understood from the following description and drawings.

BRIEF DESCRIPTION OF THE DRAWINGS

FIGS. 1C and 1D depict exemplary frequency responses of the triplexer depicted in FIG. 1A.

FIGS. 2C and 2D depict an exemplary frequency response of the diplexer depicted in FIG. 2A.

DETAILED DESCRIPTION OF THE INVENTION

As utilized herein the terms "circuits" and "circuitry" refer to physical electronic components (i.e. hardware) and any software and/or firmware ("code") which may configure the hardware, be executed by the hardware, and or otherwise be associated with the hardware. As utilized herein, "and/or" means any one or more of the items in the list joined by "and/or." For example, "x and/or y" means any element of the three-element set {(x), (y), (x, y)}. Similarly, "x, y, and/or z" means any element of the seven-element set {(x), (y), (z), (x, y), (x, z), (y, z), (x, y, z)}. As utilized herein, the term "module" means hardware, software, firmware, or any combination of one or more thereof. As utilized herein, the term "exemplary" means serving as a non-limiting example, instance, or illustration.

Figure 1A:
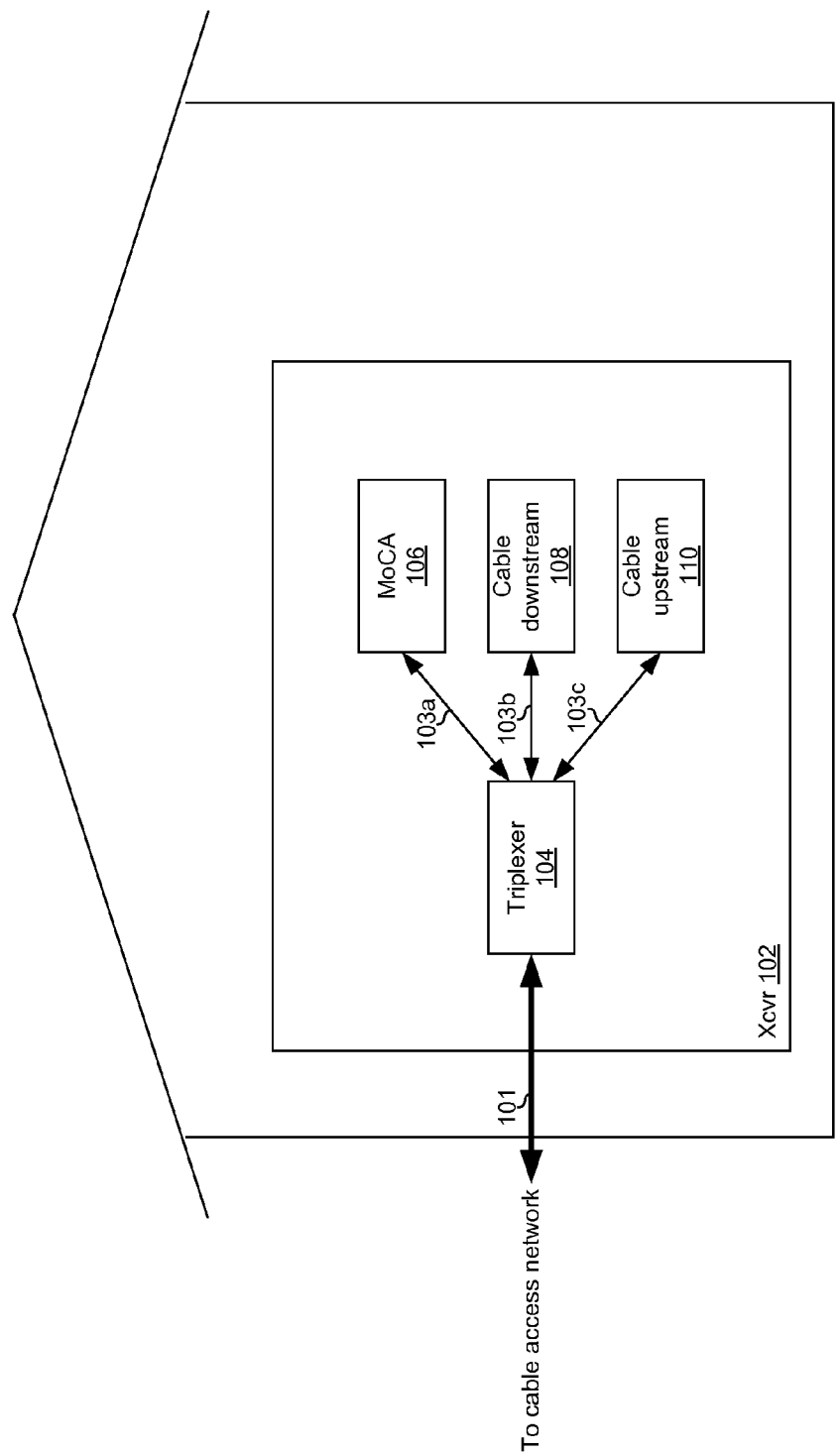
FIG. 1A illustrates an exemplary multiband communication system.

FIG. 1A illustrates an exemplary multiband communication system. Referring to FIG. 1A, there is shown a transceiver circuit 100 which comprises a triplexer 104, a Multimedia over Coaxial Alliance (MoCA) processing module 106, a cable television downstream ("cable DS") processing module 108, and a cable upstream ("cable US") processing module 110, where cable US is, for example, a DOCSIS upstream.

The transceiver 100 may reside, for example, in a set-top-box. The transceiver 100 may be operable to transmit and/or receive, via the triplexer 104, frequency multiplexed signals over the physical link 101. The physical link 101 may comprise, for example, coaxial or twisted-pair cabling.

Figure 1B:
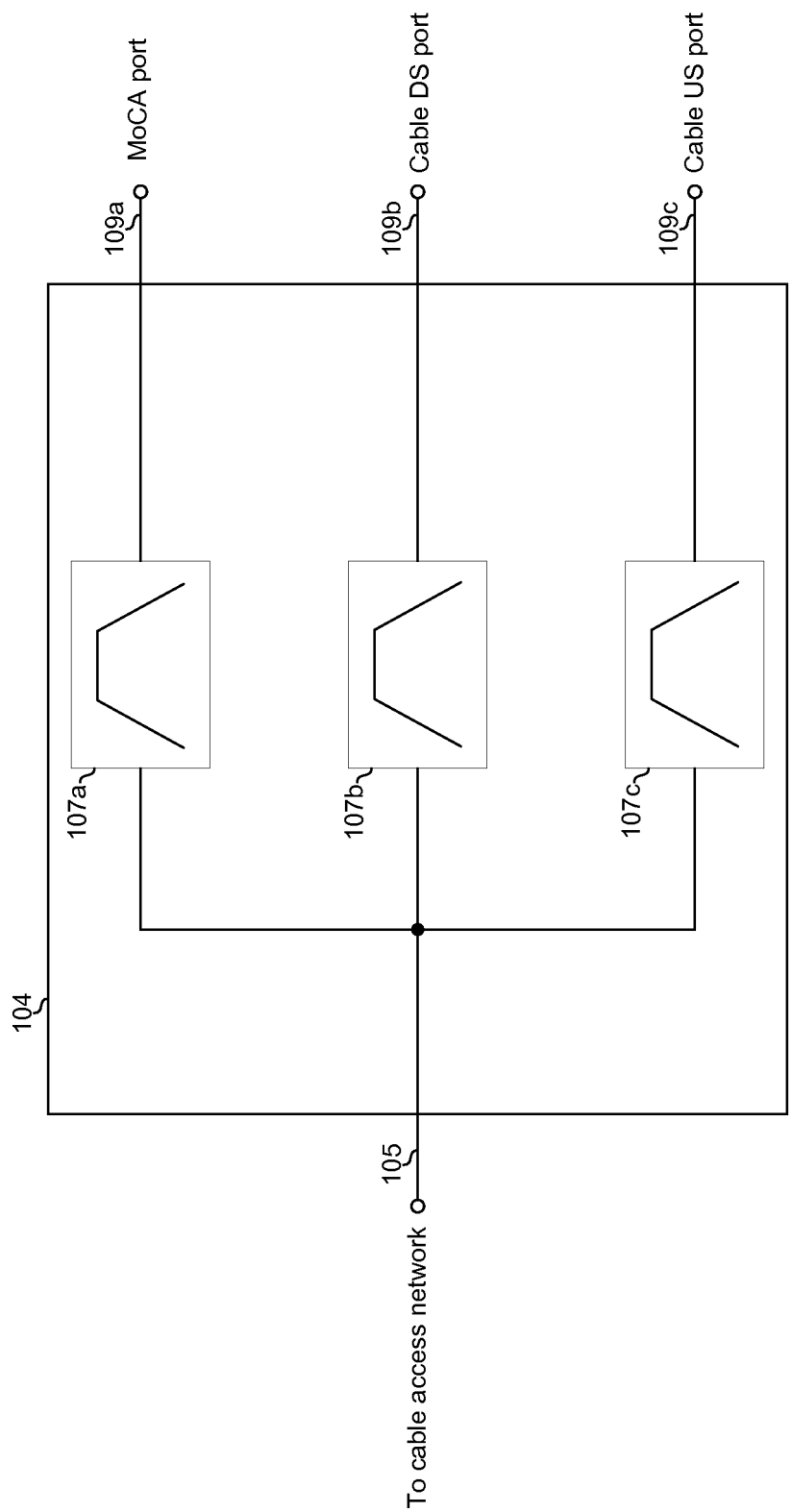
FIG. 1B depicts an exemplary embodiment of the triplexer depicted in FIG. 1A.

The triplexer 104 may be operable to separate a frequency multiplexed signal into its constituent signals. An exemplary embodiment of the triplexer 104 is depicted in FIG. 1B.

The MoCA processing module 106 may be operable to process MoCA signals. Exemplary operations performed by the MoCA processing module 106 comprise modulation, demodulation, encoding, and decoding of MoCA signals.

The cable DS processing module 108 may be operable to process cable DS signals. Exemplary operations performed by the cable DS processing module 108 comprise demodulation and decoding of cable DS signals.

The cable US processing module 110 may be operable to process cable US signals. Exemplary operations performed by the cable US processing module 110 comprise modulation and encoding of cable US signals.

In operation, a composite signal comprising a cable US signal, a cable DS signal, and a MoCA signal is present on the physical link 101. A first component of the composite signal comprises cable US signals, which utilize a first frequency band on the physical link 101. A second component of the composite signal comprises cable DS signals, which utilize a second frequency band on the physical link 101. A third component of the composite signal comprises MoCA signals, which utilize a third frequency band on the physical link 101. The triplexer 104 may filter the composite signal to reduce undesired signal components at each of the MoCA processing module 106, the cable DS processing module 108, and the cable US processing module 110. Referring to FIG. 1B, the triplexer 104 may, for example, comprise filters 107a, 107b, and 107c. The filter 107a may be operable to reduce the strength of cable US and cable DS signal components at the MoCA port 109. Filter 107a may also be operable to attenuate unwanted noise from devices connected to the MoCA port 109a such that the noise leaking from the MoCA port 109a to one or more of the ports 105, 109b, and 109c is reduced. Similarly, the filter 107b may be operable to reduce the strength of MoCA and cable US signal components at the cable DS port 109b. The filter 107c may be operable to reduce the strength of MoCA and cable DS signal components at the cable US port 109c. Although the embodiment of the triplexer 104 depicted in FIG. 1B comprises three bandpass filters, the invention is not so limited. The triplexer 104 may comprise fewer or additional filters, and/or one or more of the filters may be low-pass filters. For example, the filter 107c may be absent in one embodiment and may be replaced with a low-pass filter in another embodiment.

Referring now to FIGS. 1C-1D, shown are three frequency bands 111a, 111b, and 111c corresponding to the MoCA frequency band, the cable DS frequency band, and the cable US frequency band, respectively. Also shown are exemplary frequency responses 113a, 113b, and 113c corresponding, respectively to the filters 107a, 107b, and 107c. FIG. 1C depicts an embodiment in which higher-order filters are utilized to achieve faster frequency roll-off. FIG. 1D, on the other hand, depicts an embodiment in which lower-order filters, with corresponding slower roll-off, are utilized. The hashed regions 112, 114, 116, and 118 indicate the leakage between the various signals and the neighboring frequency band. Comparison of FIGS. 1C and 1D shows that higher-order filters reduce such leakage. The use of higher-order filters, however, comes with increased cost, as well as compromises in other aspects of the filter design, such as insertion loss and/or passband ripple. Simply replacing a higher-order filter with a lower-order filter may not, however, have the desired power savings effect because the higher leakage of the lower-order filter may necessitate increased power consumption in the cable downstream receiver. For example, in some cases, the MoCA transmit signal may be much stronger than the cable downstream signal, and as a result, the signal power in leakage region 118 may be much larger than the desired signal power in the cable downstream band. To accommodate this large undesired signal, the cable downstream receiver may need to have a larger dynamic range, which leads to higher power consumption and/or cost. Accordingly, aspects of the invention enable using lower-order filters to reduce cost, without allowing leakage to critically impair operations of the transceiver 102.

Figure 1E:
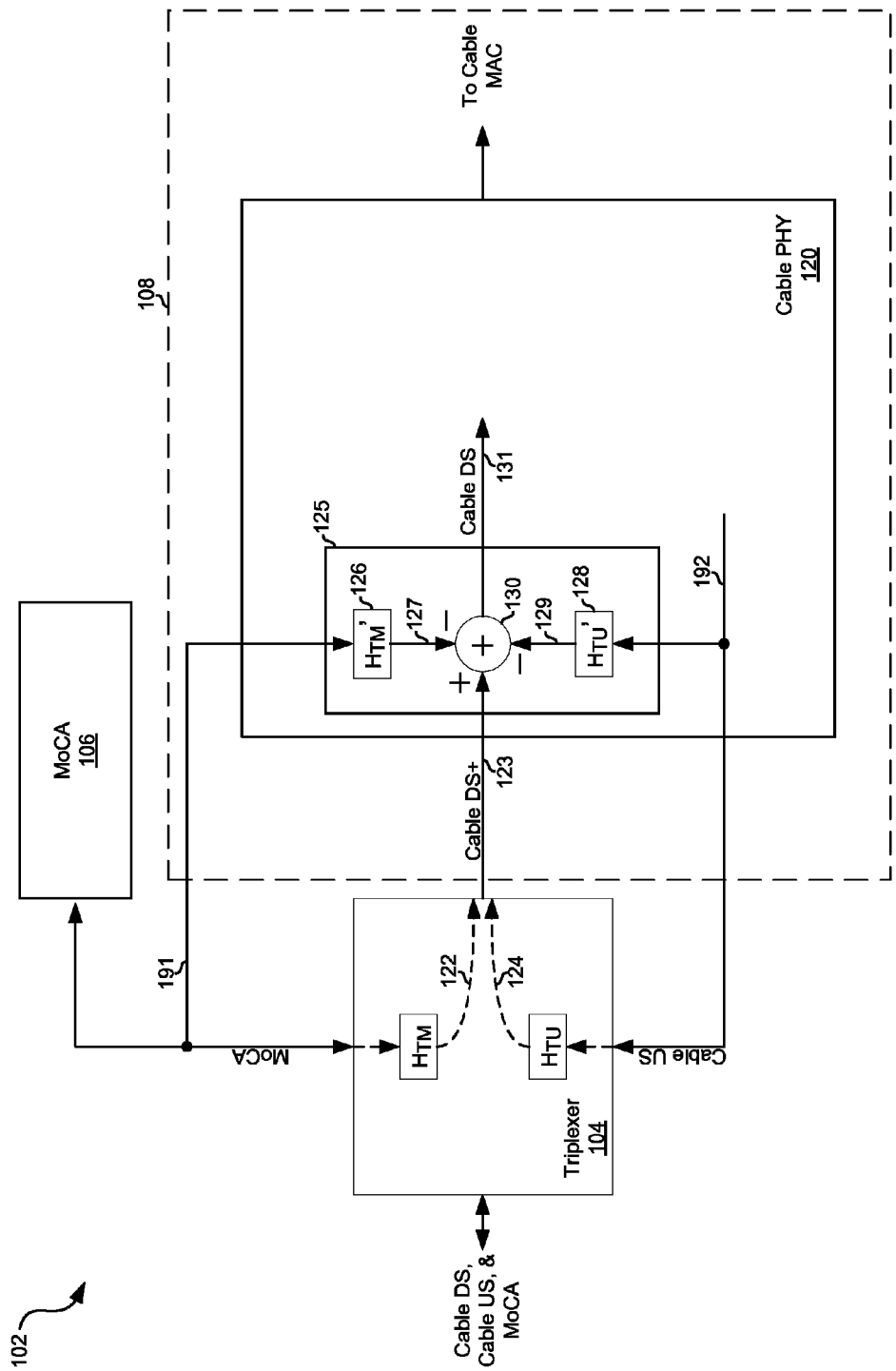
FIG. 1E illustrates an exemplary transceiver that comprises the triplexer of FIG. 1A, and is operable to compensate for leakage in the triplexer.

FIG. 1E illustrates an exemplary transceiver that comprises the triplexer of FIG. 1A, and is operable to compensate for leakage in the triplexer. Referring to FIG. 1E, there is shown portions of an exemplary embodiment of the transceiver 102. For clarity of illustration, only selected portions of the transceiver 102 and its components are shown, namely, the triplexer 104, the MoCA processing module 106, and portions of the cable television physical layer transceiver (PHY) 120. The depicted portion of the cable PHY 120 comprises the leakage processing module 125 which, in turn, comprises impedance networks 126 and 128, and combiner 130.

The dashed line 122 in the triplexer 104 represents leakage from the MoCA port of the triplexer 104 to the cable DS port of the triplexer 104. This leakage may be characterized by the transfer function $H_{TM}$. The dashed line 124 in the triplexer 104 represents leakage from the cable US port of the triplexer 104 to the cable DS port of the triplexer 104. This leakage may be characterized by the transfer function $H_{TU}$.

The impedance network 126 may be operable to have a transfer function, $H_{TM}'$, which is equal to, or approximately equal to, the transfer function $H_{TM}$. The impedance network 126 may comprise, for example, an RC, RL, LC, or RLC circuit. The impedance network 126 may be configured during fabrication of the transceiver 102. The impedance network 126 may alternatively (or additionally) be configured during a self-test procedure that is, for example, performed periodically and/or at start-up of the transceiver 102. The impedance network 126 may be configured dynamically during operation of the transceiver 102 such that the transfer function $H_{TM}'$ may be changed during transmission and/or reception of cable and/or MoCA signals by the transceiver 102. Configuring the impedance network 126 may comprise, for example, configuring and/or programming one or more switching elements, and one or more fuse-based elements, one or more multi-gate MOS devices, and/or one or more memory cells.

The impedance network 128 may be operable to have a transfer function, $H_{TU}'$, which is equal to, or approximately equal to, the transfer function $H_{TU}$. The impedance network 128 may comprise, for example, an RC, RL, LC, or RLC circuit. The impedance network 128 may be configured during fabrication of the transceiver 102. The impedance network 128 may alternatively (or additionally) be configured during a self-test procedure that is, for example, performed periodically and/or at start-up of the transceiver 102. The impedance network 128 may be configured dynamically during operation of the transceiver 102 such that the transfer function $H_{TU}'$ may be changed during operation of the transceiver 102. Configuring the impedance network 128 may comprise, for example, configuring and/or programming one or more switching elements, and one or more fuse-based elements, one or more multi-gate MOS devices, and/or one or more memory cells.

The combiner 130 may be operable to combine the signals 123, 127, and 129 to generate the signal 131. The sign of each of the signals 123, 127, and 129 may be configurable. In the embodiment of the leakage processing module 125 depicted in FIG. 1E, the sign of signal 123 is positive, the sign of signal 127 is negative, and the sign of signal 129 is negative. In this manner, the signals 127 and 129 are subtracted from the signal 123 to generate the signal 131.

During operation of an exemplary embodiment of the transceiver 102, the transceiver 102 may power up and perform a self-test. During the self-test, the leakage 122 and 124 may be measured or estimated utilizing test signals. The impedance network 126 may be configured such that the signal 127 approximates the leakage 122. The impedance network 128 may be operable such that the signal 129 approximates the leakage 124. After the self-test completes, the transceiver 102 may enter a normal mode of operation and begin transmitting and receiving cable television and MoCA signals.

The cable US signal and the MoCA signal may leak onto the signal 123 output by the triplexer 104. The cable US signal may be processed by the impedance network 128 to generate the signal 129 that approximates the leakage 124. The signal 129 may then be subtracted from the signal 123 by the combiner 130. The MoCA signal may be processed by the impedance network 126 to generate the signal 127 that approximates the leakage 122. The signal 129 may then be subtracted from the signal 123 by the combiner 130. The signal 131 output by the combiner 230 may then be conveyed to other circuitry of the transceiver 102 for further processing to recover the downstream cable data.

In an embodiment of the invention, the leakage processing module 125 may be disabled when it is determined that it is unnecessary. Disabling the leakage processing module 125 may comprise, for example, decoupling it from a power supply and bypassing it by coupling the signal 123 directly to the signal 131. The leakage processing module 125 may, for example, be determined to be unnecessary when the leakage components 122 and 124 are each sufficiently small. The leakage processing module 125 may, for example, be determined to be unnecessary when a bit-error rate of the signal 131 is sufficiently low. For still another example, the leakage processing module 125 may be determined to be unnecessary when the amount of MoCA transmit activity or cable upstream activity by the transceiver 102 is below a threshold. This may be a result of an assumption that the MoCA receive signals will be sufficiently low-strength so as not to interfere with the cable DS signal, and MoCA and cable US transmit activity may be of sufficiently short bursts such that an errors in the signal 131 resulting from the activity can be sufficiently compensated for by error correction techniques.

Figure 1F:
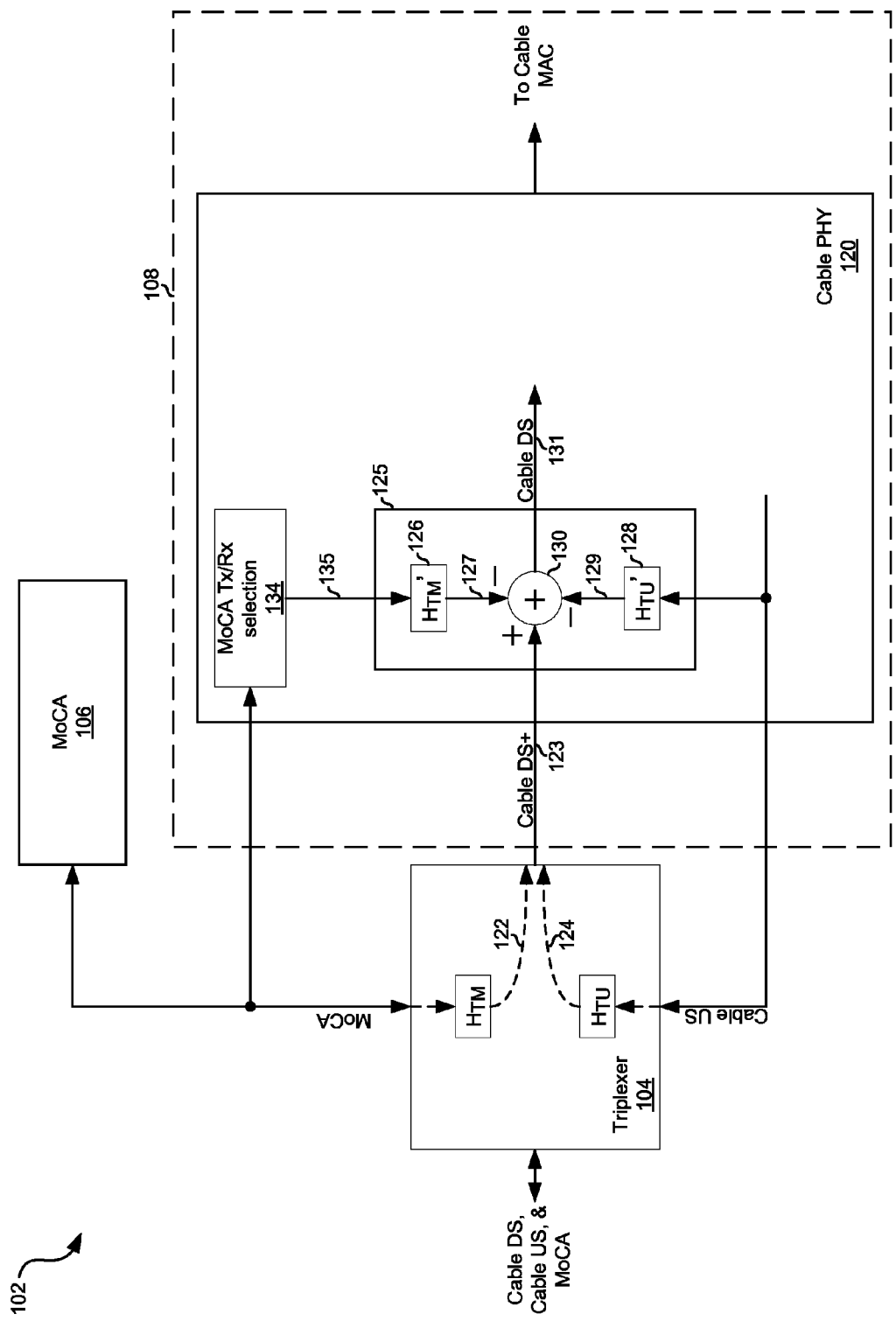
FIG. 1F illustrates an exemplary transceiver that comprises the triplexer of FIG. 1A, and is operable to compensate for leakage in the triplexer.

FIG. 1F illustrates an exemplary transceiver that comprises the triplexer of FIG. 1A, and is operable to compensate for leakage in the triplexer. The embodiment of the transceiver 102 depicted in FIG. 1F is similar to the embodiment depicted in FIG. 1E. The embodiment in FIG. 1F, however, differs in that it additionally comprises the MoCA Tx/Rx selection module 134.

The MoCA Tx/Rx selection module 134 may be operable to select whether MoCA receive signals, MoCA transmit signals, or both MoCA transmit signals and MoCA receive signals are output as signal 135. Thus, the MoCA Tx/Rx selection module 134 may be configured such that the signal 135 output by the MoCA Tx/Rx selection module 134 may comprise substantially only the MoCA transmit signal or substantially only the MoCA receive signal.

In operation, the MoCA transmit signal may be substantially stronger than the MoCA receive signal. Accordingly, in some instances the MoCA receive signal may be ignored when generating the signal 127 without critically impacting the signal 131. In such instances the selection module 134 may be configured to pass both the MoCA transmit signal and the MoCA receive signal. In other instances, the MoCA receive signal may be sufficiently strong that subtracting it from the signal 123 may critically impact the signal 131. In such instances, the MoCA Tx/Rx selection module 134 may be configured such that the signal 135 comprises substantially only the MoCA transmit signal.

Figure 1G:
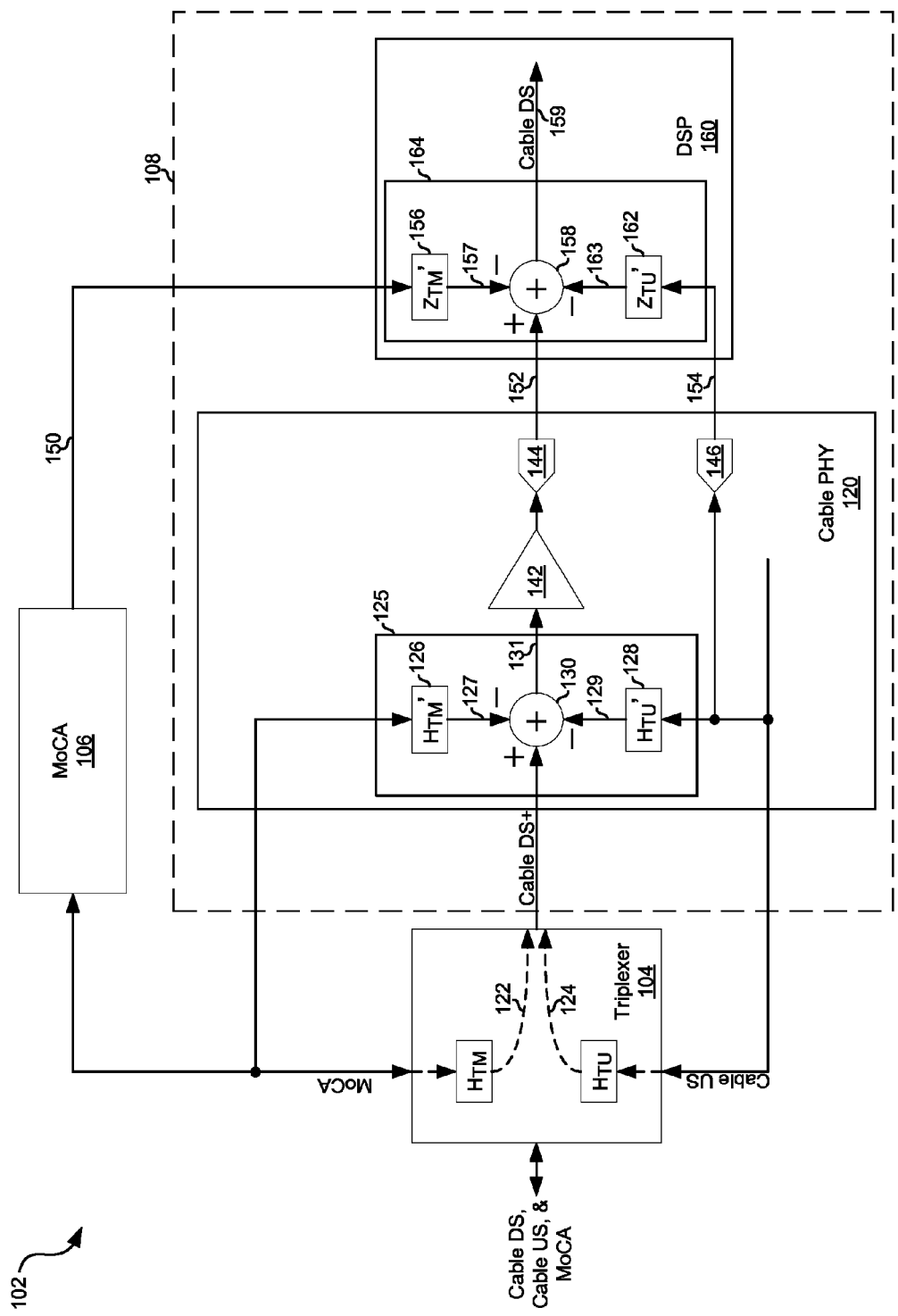
FIG. 1G illustrates an exemplary transceiver that comprises the triplexer of FIG. 1A, and is operable to compensate for leakage in the triplexer.

FIG. 1G illustrates an exemplary transceiver that comprises the triplexer of FIG. 1A, and is operable to compensate for leakage in the triplexer. Referring to FIG. 1G, there is shown portions of an exemplary embodiment of the transceiver 102. For clarity of illustration, only selected portions of the transceiver 102 and its components are shown. Portions of FIG. 1G that are also shown in FIG. 1E may, for example, be as described above with respect to FIG. 1E. Also shown is a digital signal 150 output by the MoCA processing module 106, a buffer/amplifier 142, analog-to-digital converter (ADC) 144, ADC 146, and portions of a digital signal processing (DSP) module 160. The depicted portion of the cable DSP module 160 comprises the leakage processing module 164 which, in turn, comprises impedance networks 156 and 162, and combiner 158.

The DSP 160 may be operable to perform various digital signal processing operations, such as, for example, leakage cancellation or removal in the digital domain. In this regard, the signal processing module 156 may be operable to process the signal 150 to generate a signal 157 that approximates a difference between the leakage 122 and the signal 127. That is, the signal 157 may approximate the residual MoCA components remaining in the signal 152. The signal processing module 162 may be operable to process the digitized cable US signal 154 to generate a signal 163 that approximates a difference between the leakage 124 and the signal 129. That is, the signal 163 may approximate the residual cable US components remaining in the signal 152. In this manner, the leakage processing module 125 may provide coarse leakage cancellation or removal while the leakage processing module 164 may provide fine leakage cancellation or removal. In another embodiment of the invention, leakage cancellation or removal may take place entirely in the digital domain. For example, the output of the triplexer 104 may be amplified/buffer, digitized, and input to the leakage processing module 164.

In operation, the output 131 of the leakage processing module 125 may be amplified and/or buffered by the amplifier/buffer 142 and converted to a digital representation 152 by the ADC 144. The signal processing module 156 may generate the signal 157, the signal processing module 162 may generate the signal 163. The combiner 158 may subtract the signals 157 and 163 from the signal 152 to generate the signal 159. The signal 159 output by the combiner 158 may then be conveyed to other circuitry of the transceiver 102 for further processing to recover the downstream cable data.

Figure 2A:
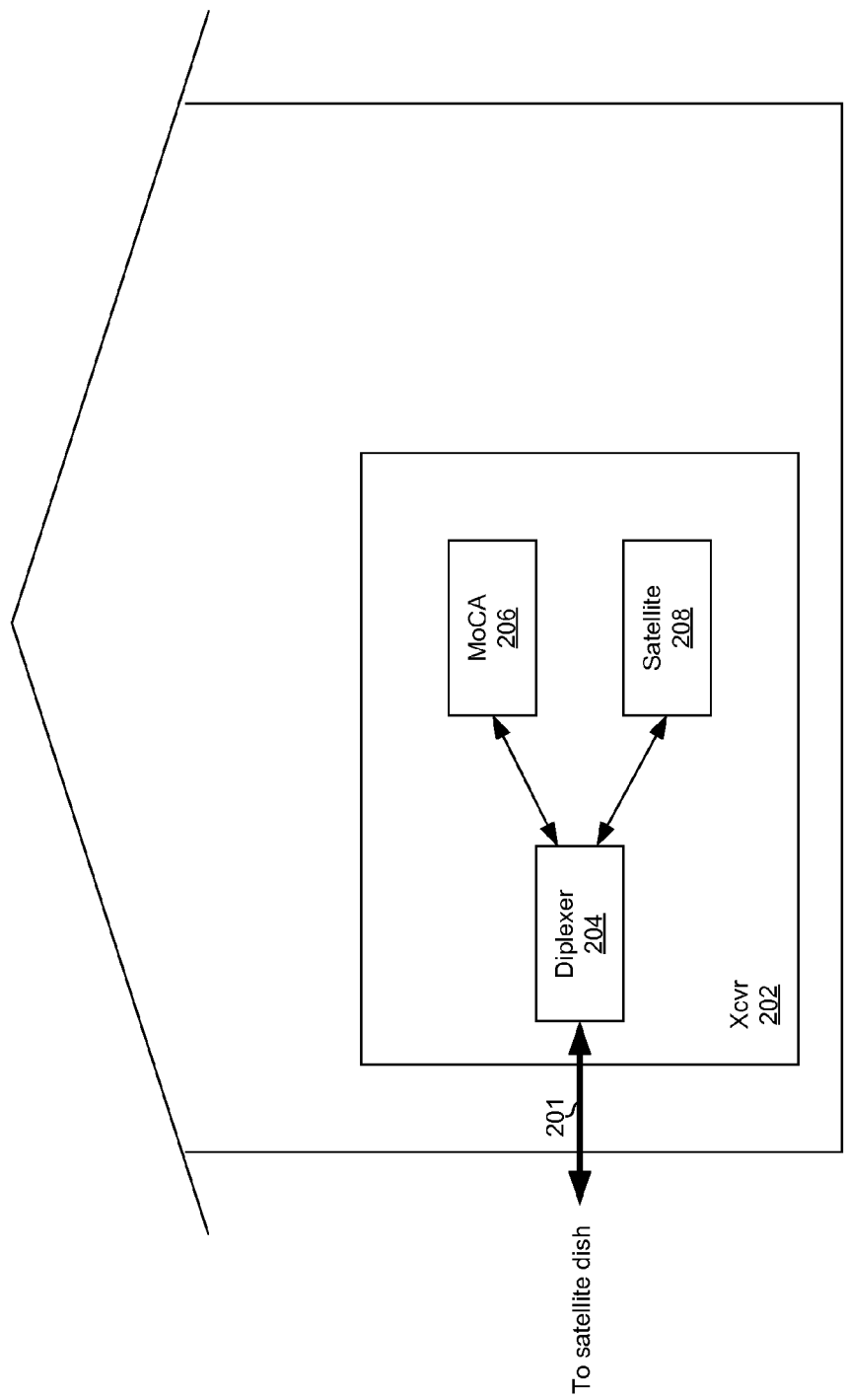
FIG. 2A illustrates an exemplary multiband communication system.

FIG. 2A illustrates an exemplary multiband communication system. FIG. 2A depicts a transceiver which concurrently supports MoCA and satellite television. The transceiver 202 comprises a diplexer 204, a MoCA processing module 206, and a satellite television downstream ("satellite DS") processing module 208.

Figure 2B:
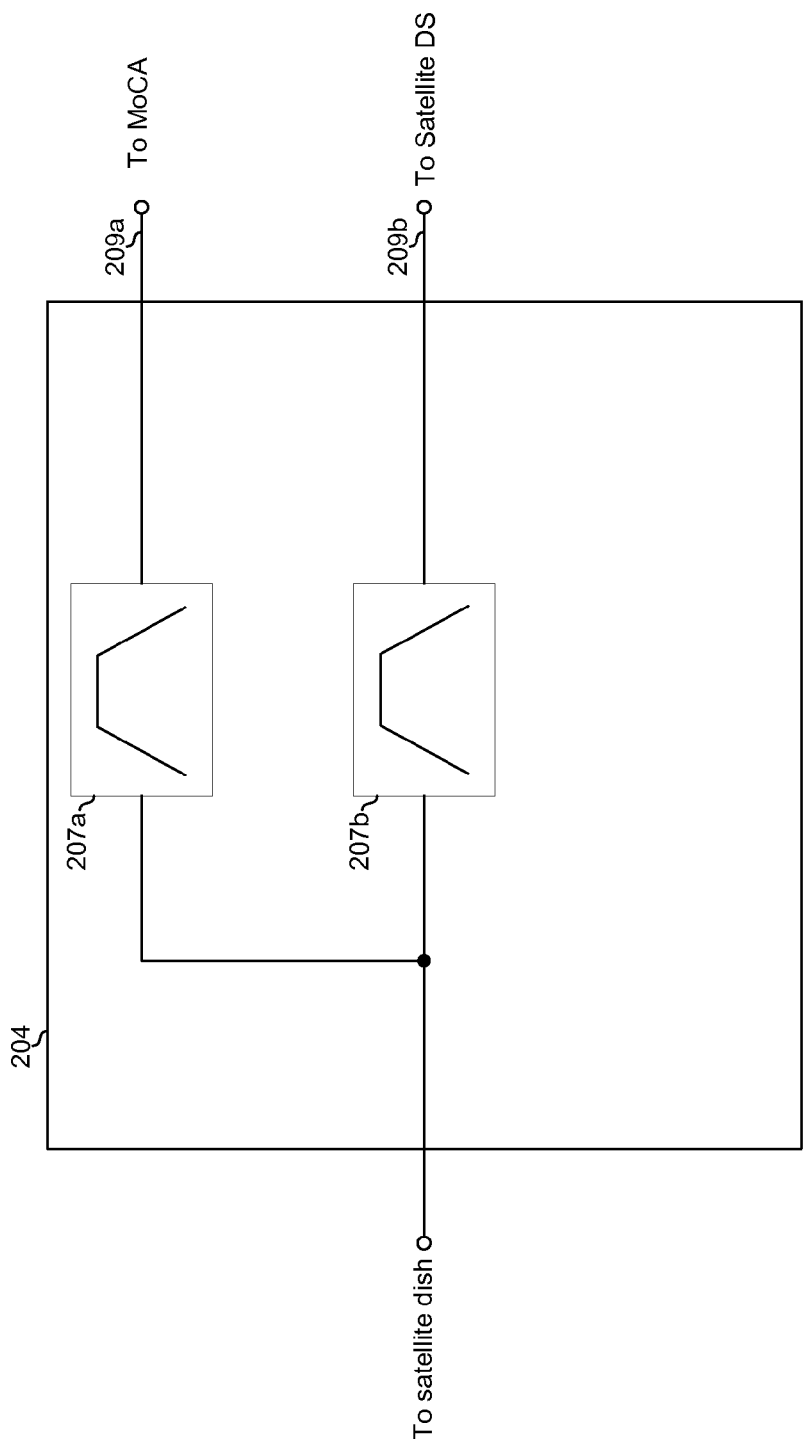
FIG. 2B depicts an exemplary embodiment of the diplexer depicted in FIG. 2A.

The diplexer 204 may be operable to separate a frequency multiplexed signal into its constituent signals. An exemplary embodiment of the diplexer 204 is depicted in FIG. 2B.

The MoCA processing module 206 may be operable to process MoCA signals. Exemplary operations performed by the MoCA processing module 206 comprise modulation, demodulation, encoding, and decoding of MoCA signals.

The satellite DS processing module 208 may be operable to process satellite DS signals. Exemplary operations performed by the satellite DS processing module 208 comprise demodulation and decoding of satellite DS signals.

In operation, a composite signal comprising a satellite DS signal and a MoCA signal is present on the physical link 201. A first component of the composite signal comprises satellite DS signals, which utilize a first frequency band on the physical link 201. A second component of the composite signal comprises MoCA signals, which utilize a second frequency band on the physical link 201. The diplexer 204 may filter the composite signal to reduce undesired signal components at each of the MoCA processing module 206, and the satellite DS processing module 208. Referring to FIG. 2B, the diplexer 204 may, for example, comprise filters 207a and 207b. The filter 207a may be operable to reduce the strength of satellite DS signal components at the MoCA port 209a. Similarly, the filter 207b may be operable to reduce the strength of MoCA signal components at the satellite DS port 209b.

Referring now to FIGS. 2C-2D, shown are two frequency bands 211a and 211b corresponding to the MoCA frequency band, and the satellite television DS frequency band, respectively. Also shown are exemplary frequency responses 213a and 213b corresponding, respectively, to the filters 207a and 207b. FIG. 2C depicts an embodiment in which higher-order filters are utilized to achieve faster frequency roll-off. FIG. 2D, on the other hand, depicts an embodiment in which lower-order filters, with corresponding slower roll-off, are utilized. The hashed regions 212 and 214 indicate the leakage between the various signals and the neighboring frequency band. Comparison of FIGS. 2C and 2D shows that higher-order filters reduce such leakage. The use of higher-order filters, however, comes with increased cost. Accordingly, aspects of the invention enable using lower-order filters to reduce cost, without allowing leakage to critically impair operations of the transceiver 202.

Figure 2E:
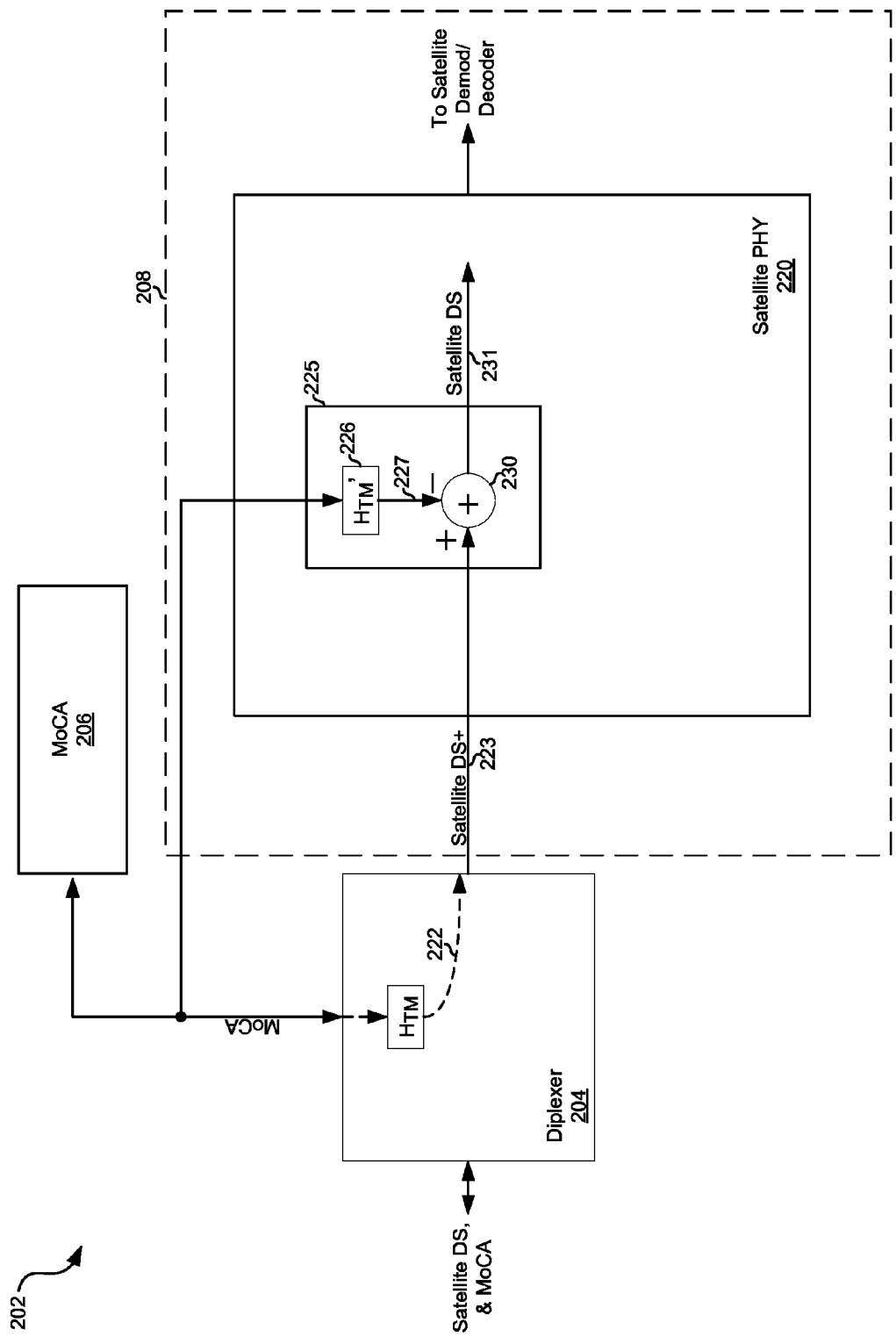
FIG. 2E illustrates an exemplary receiver that comprises the diplexer of FIG. 2A, and is operable to compensate for leakage in the diplexer.

FIG. 2E illustrates an exemplary transceiver that comprises the diplexer of FIG. 2A, and is operable to compensate for leakage in the diplexer. Referring to FIG. 2E, there is shown portions of an exemplary embodiment of the transceiver 202. For clarity of illustration, only selected portions of the transceiver 202 and its components are shown. Shown are the diplexer 204, the MoCA processing module 206, and portions of the satellite television physical layer transceiver (PHY) 220. The depicted portion of the satellite PHY 220 comprises the leakage processing module 225 which, in turn, comprises impedance network 226, and combiner 230.

The dashed line 222 in the diplexer 204 represents leakage from MoCA port of the diplexer 204 to the satellite DS port of the diplexer 204. This leakage may be characterized by the transfer function $H_{TM}$.

The impedance network 226 may be operable to have a transfer function, $H_{TM}'$, which is equal to, or approximately equal to, the transfer function $H_{TM}$. The impedance network 226 may be configured during fabrication of the transceiver 202. The impedance network 226 may alternatively (or additionally) be configured during a self-test procedure which is, for example, performed periodically and/or at start-up of the transceiver 202. The impedance network 226 may be configured dynamically during operation of the transceiver 202 such that the transfer function $H_{TM}'$ may be changed during transmission and/or reception of satellite and/or MoCA signals by the transceiver 102.

The combiner 230 may combine the signals 223 and 227 to generate the signal 231. The sign of each of the signals 223 and 227 may be configurable. In the embodiment of the leakage processing module 225 depicted in FIG. 2E, the sign of signal 223 is positive and the sign of signal 227 is negative. In this manner, the signal 227 is subtracted from the signal 223 to generate the signal 231.

During operation of an exemplary embodiment of the transceiver 202, the transceiver 202 may power up and perform a self-test. During the self-test, the leakage 222 may be measured or estimated utilizing test signals. The impedance network 226 may be configured such that the signal 227 approximates the leakage 222. After the self-test completes, the transceiver 202 may enter a normal mode of operation and begin transmitting and receiving satellite television and MoCA signals.

The MoCA signal may leak onto the signal 223 output by the diplexer 204. The MoCA signal may be processed by the impedance network 226 to generate the signal 227 that approximates the leakage 222. The signal 229 may then be subtracted from the signal 223 by the combiner 230. The signal 231 output by the combiner 230 may then be conveyed to other circuitry of the transceiver 202 for further processing to recover the downstream satellite data.

Figure 2F:
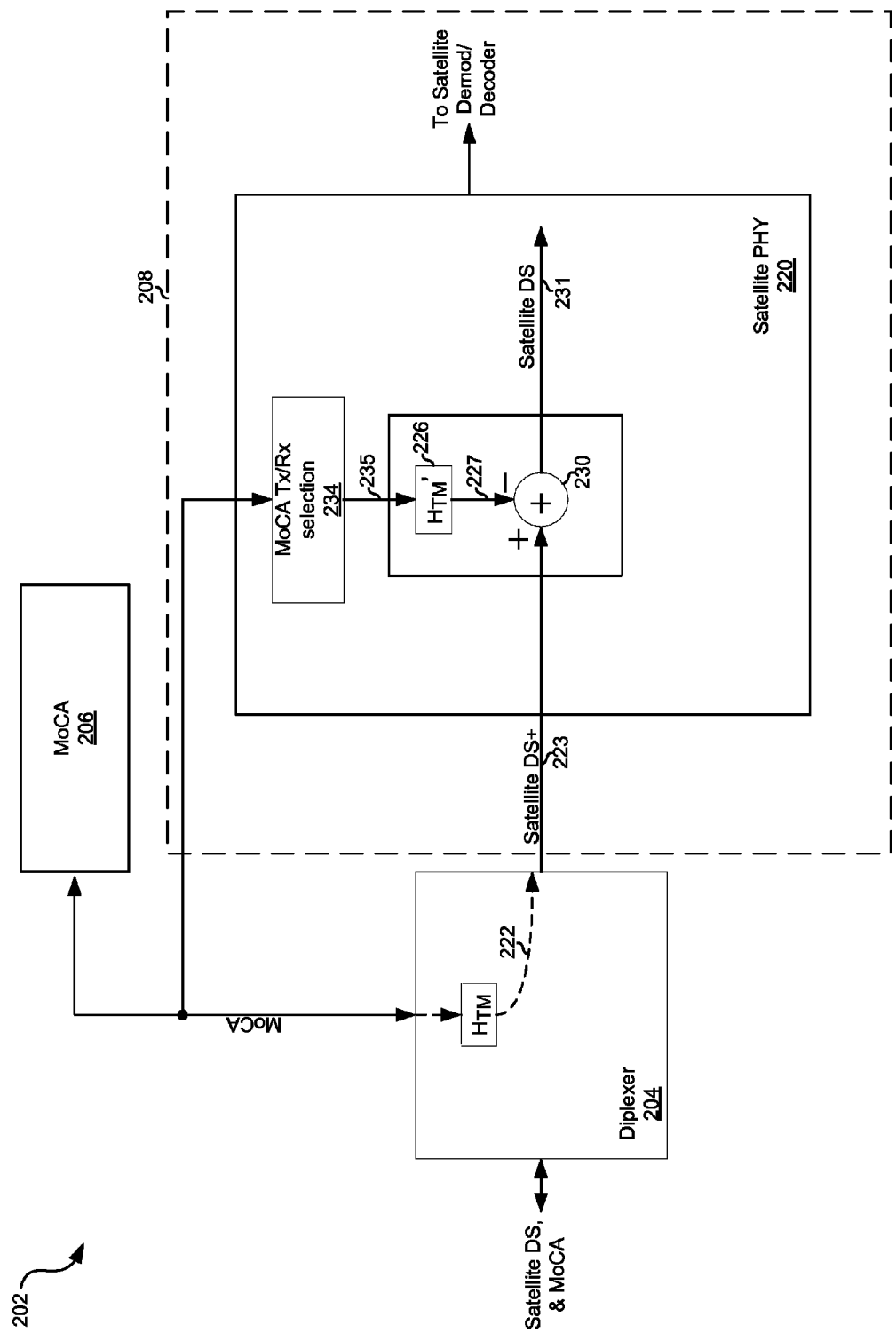
FIG. 2F illustrates an exemplary receiver that comprises the diplexer of FIG. 2A, and is operable to compensate for leakage in the diplexer.

FIG. 2F illustrates an exemplary transceiver that comprises the diplexer of FIG. 2A, and is operable to compensate for leakage in the diplexer. The embodiment of the transceiver 102 depicted in FIG. 2F is similar to the embodiment depicted in FIG. 2E. However, the embodiment in FIG. 2F differs in that it additionally comprises the MoCA Tx/Rx selection module 234.

The MoCA Tx/Rx selection module 234 may be operable to select whether MoCA receive signals, MoCA transmit signals, or both MoCA transmit signals and MoCA receive signals are output as signal 235. Thus, the MoCA Tx/Rx selection module 234 may be configured such that the signal 235 output by the MoCA Tx/Rx selection module 234 may comprise substantially only the MoCA transmit signal or substantially only the MoCA receive signal.

In operation, the MoCA transmit signal may be substantially stronger than the MoCA receive signal. Accordingly, in some instances the MoCA receive signal may be ignored when generating the signal 227 without critically impacting the signal 231. In such instances the selection module 234 may be configured to pass both the MoCA transmit signal and the MoCA receive signal. In other instances, the MoCA receive signal may be sufficiently strong that subtracting it from the signal 223 may critically impact the signal 231. In such instances, the MoCA Tx/Rx selection module 234 may be configured such that the signal 235 comprises substantially only the MoCA transmit signal.

Figure 2G:
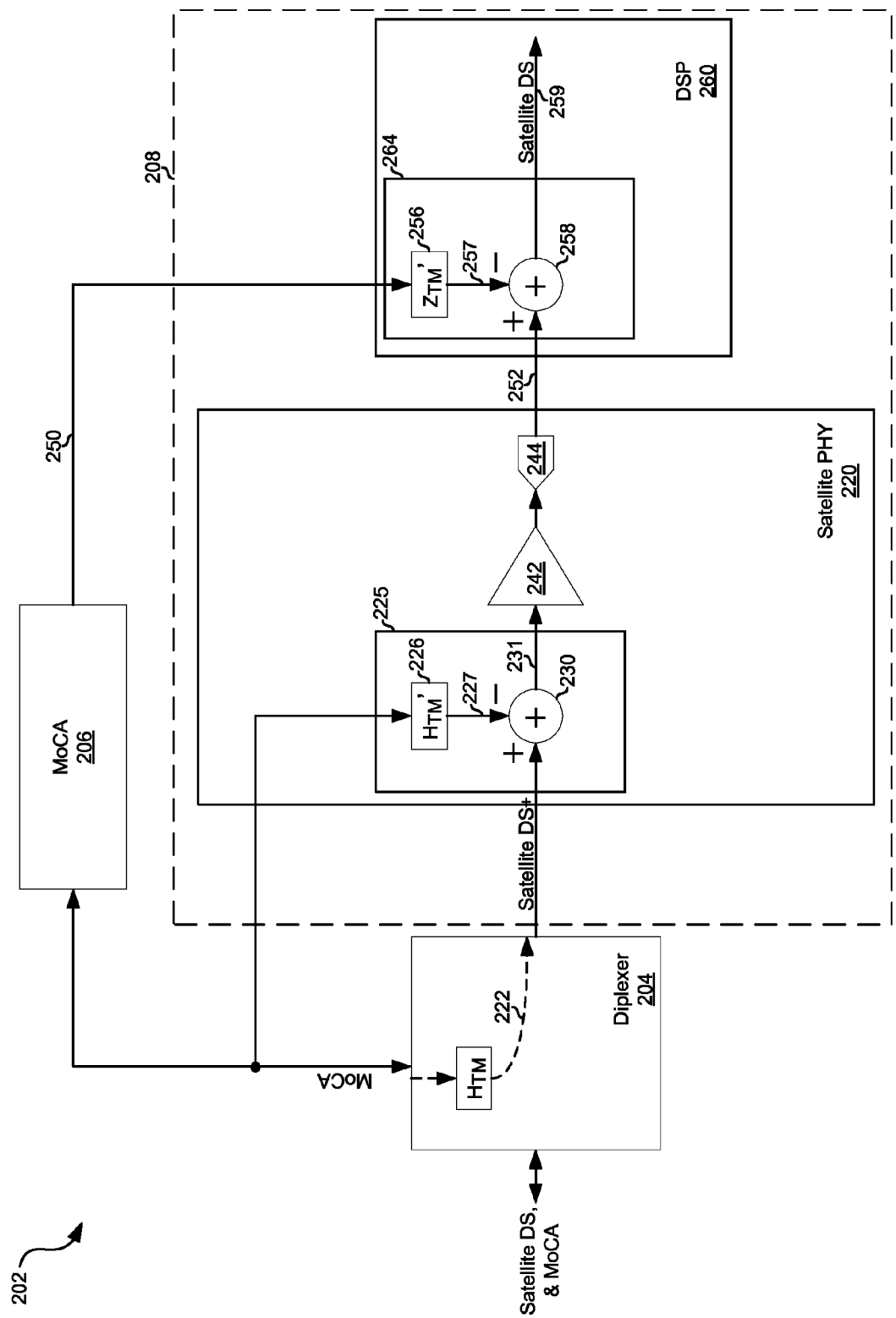
FIG. 2G illustrates an exemplary receiver that comprises the diplexer of FIG. 2A, and is operable to compensate for leakage in the diplexer.

FIG. 2G illustrates an exemplary transceiver that comprises the diplexer of FIG. 2A, and is operable to compensate for leakage in the diplexer. Referring to FIG. 2G, there is shown portions of an exemplary embodiment of the transceiver 202. For clarity of illustration, only selected portions of the transceiver 202 and its components are shown. Portions of FIG. 2G that are also shown in FIG. 2E may, for example, be as described above with respect to FIG. 2E. Also shown is a digital signal 250 output by the MoCA processing module 206, a buffer/amplifier 242, analog-to-digital converter (ADC) 244, and portions of a digital signal processing (DSP) module 260. The depicted portion of the satellite DSP module 260 comprises the leakage processing module 264 which, in turn, comprises signal processing module 256 and combiner 258.

The DSP 260 may be operable to perform various digital signal processing operations, one such operation being leakage cancellation or removal in the digital domain. In this regard, the signal processing module 256 may be operable to process the signal 250 to generate a signal 257 that approximates a difference between the leakage 222 and the signal 227. That is, the signal 257 may approximate the residual MoCA components remaining in the signal 252. In this manner, the leakage processing module 225 may provide coarse leakage cancellation or removal while the leakage processing module 264 may provide fine leakage cancellation or removal. In another embodiment of the invention, leakage cancellation or removal may take place entirely in the digital domain. For example, the output of the diplexer 204 may be amplified and buffered, digitized, and input to the leakage processing module 264.

In operation, the output 231 of the leakage processing module 225 may be amplified and buffered by the amplifier/buffer 242, and converted to a digital representation 252 by the ADC 244. The signal processing module 256 may generate the signal 257, and the combiner 258 may subtract the signal 257 from the signal 252 to generate the signal 259. The signal 259 output by the combiner 258 may then be conveyed to other circuitry of the transceiver 202 for further processing to recover the downstream satellite data.

Figure 3:
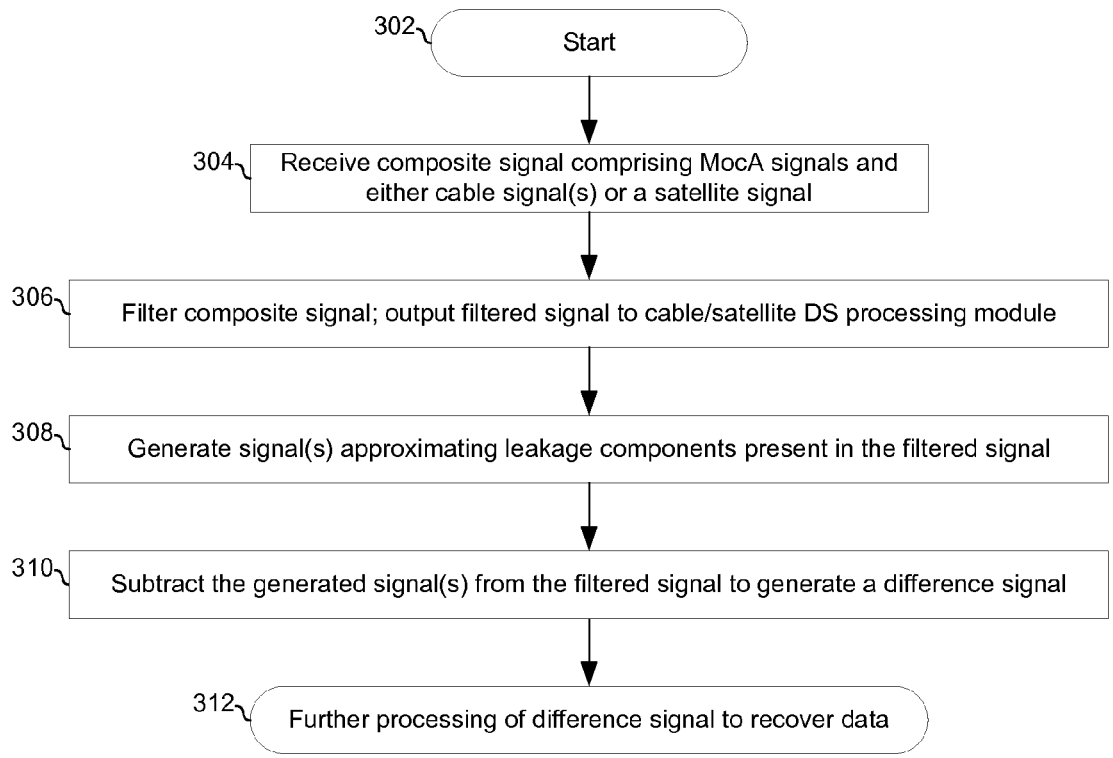
FIG. 3 is a flow chart illustrating exemplary steps for compensating for leakage in a multiband communication system.

FIG. 3 is a flow chart illustrating exemplary steps for compensating for leakage in a multiband communication system. Referring to FIG. 3, after start step 302, the exemplary steps may advance to step 304 in which a transceiver (e.g., transceiver 102 or transceiver 202) may receive a composite signal comprising MoCA signals and either cable downstream and upstream signals, or a satellite downstream signal. In step 306, the composite signal may be filtered and the filtered signal may be output to either a cable downstream processing module (e.g., module 108) or satellite downstream processing module (e.g., module 208). In step 308, one or more signals which approximate a corresponding one or more leakage components of the filtered signal (e.g., signals 127 and 129 approximating leakage components 122 and 124) may be generated. In step 310, the one or more signals generated in step 308 may be subtracted from the filtered signal to generate a difference signal. In step 312, the difference signal may be further processed to recover the cable or satellite downstream data.

Figure 4:
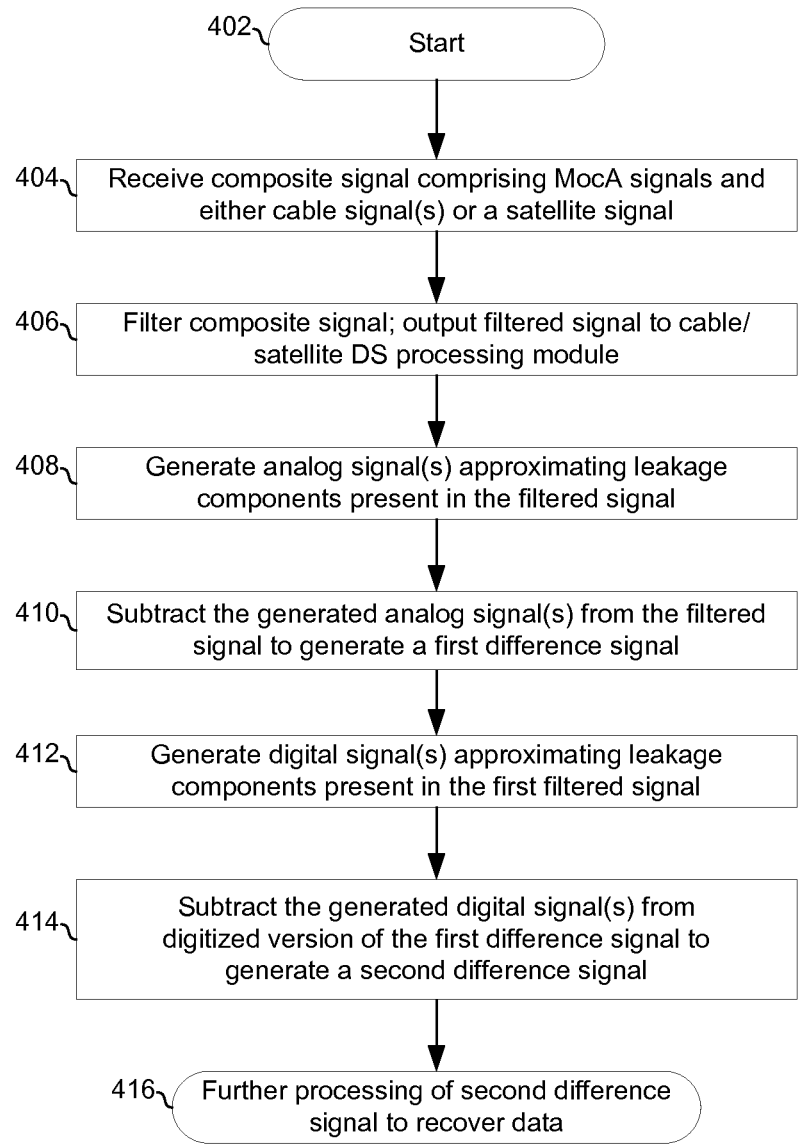
FIG. 4 is a flow chart illustrating exemplary steps for compensating for leakage in a multiband communication system.

FIG. 4 is a flow chart illustrating exemplary steps for compensating for leakage in a multiband communication system. Referring to FIG. 4, after start step 402, the exemplary steps may advance to step 404 in which a transceiver (e.g., transceiver 102 or transceiver 202) may receive a composite signal comprising MoCA signals and either cable downstream and upstream signals, or a satellite downstream signal. In step 406, the composite signal may be filtered and the filtered signal may be output to either a cable downstream processing module (e.g., module 108) or satellite downstream processing module (e.g., module 208). In step 408, one or more analog signals (e.g., signals 127 and 129), which approximate a corresponding one or more leakage components of the filtered signal, may be generated. In step 410, the one or more analog signals generated in step 408 may be subtracted, in the analog domain, from the filtered signal to generate a first difference signal. In step 412, one or more digital signals (e.g., signals 157 and 163), which approximate a corresponding one or more leakage components of the first difference signal, may be generated. In step 414, the one or more digital signals generated in step 412 may be subtracted, in the digital domain, from the first difference signal to generate a second difference signal. In step 416, the second difference signal may be further processed to recover the cable or satellite downstream data.

Figure 5:
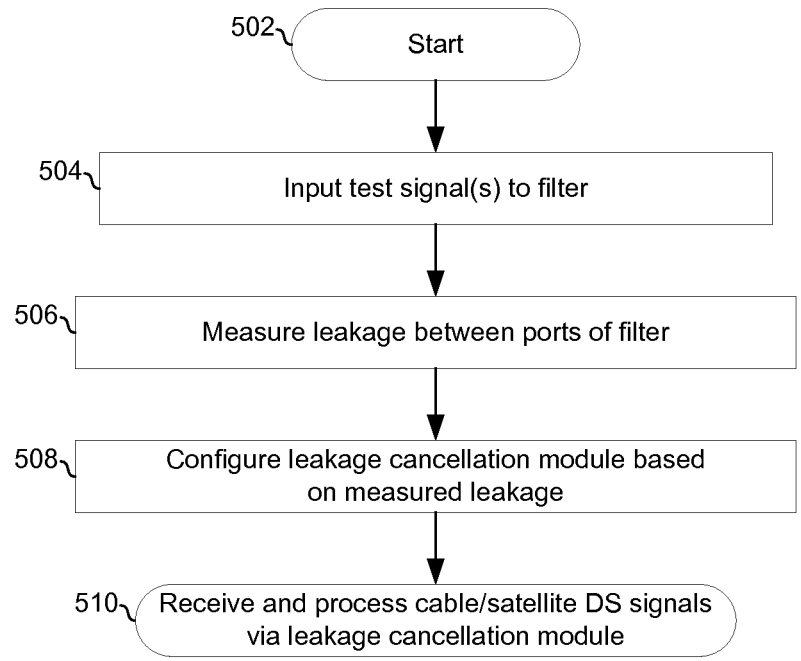
FIG. 5 is a flow chart illustrating exemplary steps for compensating for leakage in a multiband communication system.

FIG. 5 is a flow chart illustrating exemplary steps for compensating for leakage in a multiband communication system. Referring to FIG. 5, subsequent to start step 502, in step 504, test signals may be input to one or more ports of a filtering module of a transceiver (e.g., transceiver 102 or transceiver 202). In a first exemplary embodiment, a first test signal may be input to the MoCA port 109a of the triplexer 104 and a second test signal may be input to the Cable US port 109c of the triplexer 104. In a second exemplary embodiment, a test signal may be input to the MoCA port 209a of the diplexer 204. In step 506, the leakage of the test signal(s) onto another port may be measured. In the first exemplary embodiment, this may comprise measuring the signal at cable DS port 109b of the triplexer 104. In the second exemplary embodiment, this may comprise measuring the signal at satellite DS port 209b of the diplexer 204. In step 508, one or more leakage processing modules may be configured based on the results of the measurement performed in step 506. For example, one or both of the leakage processing modules 125 and 164 may be configured. In step 510, the transceiver may receive and process signals utilizing the configured leakage processing module.

An exemplary embodiment of the invention will now be described.

One or more circuits for use in the transceiver 102 comprise a triplexer 104 and a leakage processing module 125. The triplexer 104 comprises a multiband port 105, a Multimedia Over Coaxial Alliance (MoCA) port 109a, a cable television upstream port 109c, and a cable television downstream port 109b. The leakage processing module 125 comprises a cable television downstream input port via which a filtered signal 123 is received, a cable television downstream output port via which a signal 131 is output, a MoCA port via which a MoCA signal 191 is received, and a cable television upstream port via which a cable television upstream signal 192 is received. The leakage processing module is operable to process the MoCA signal 191 via a first impedance network 126 to generate a first compensation signal 127. The leakage processing module 125 is operable to process the cable upstream signal 192 via a second impedance network 128 to generate a second compensation signal 129. The leakage processing module 125 is operable to process the filtered signal 123 to generate a processed filtered signal 131. The processing of the filtered signal 123 is based, at least in part, on the first compensation signal 127 and the second compensation signal 129. The leakage processing module 125 is operable to output the processed filtered signal 131 for further processing to recover the downstream cable data.

The processing of the signal 123 comprises subtracting the first compensation signal 127 from the signal 123, and subtracting the second compensation signal 129 from the signal 123. The first impedance network 126 is configured based on a measured or estimated leakage between the MoCA port 109a of the triplexer 104 and the cable television downstream port 109b of the triplexer 104. The second impedance network 128 is configured based on a measured or estimated leakage between the cable television upstream port 109c of the triplexer 104 and the cable television downstream port 109b of the triplexer 104. The first impedance network 126 and the second impedance network 128 may be configured dynamically while the transceiver 102 is receiving cable television downstream signals and processing the received cable television downstream signals for output to a television or monitor. The first impedance network 126 and the second impedance network 128 may be fixed, For example, the impedance network 126 may be configured during manufacture and/or utilizing one-time-programmable logic.

The one or more circuits are operable to enable the leakage processing module 125 when either or both of: (1)

a measured or estimated leakage between the MoCA port 109a of the triplexer 104 and the cable television downstream port 109b of the triplexer 104; and (2) a measured or estimated leakage between the cable television upstream port 109c of the triplexer 104 and the cable television downstream port 109b of the triplexer 104 are above a threshold. The one or more circuits are operable to disable the leakage processing module 125 when either or both of: (1) the measured or estimated leakage between the MoCA port 109a of the triplexer 104 and the cable television downstream port 109b of the triplexer 104; and (2) the measured or estimated leakage between the cable television upstream port 109c of the triplexer 104 and the cable television downstream port 109b of the triplexer 104 are below a threshold.

In another exemplary embodiment of the invention, the one or more circuits are operable to digitize the MoCA signal 191 prior to the MoCA signal 191 being input to the MoCA port of the leakage processing module 125. The one or more circuits are operable to digitize the cable upstream signal 192 prior to the cable upstream signal 192 being input to the cable upstream port of the leakage processing module 125.

In another exemplary embodiment of the invention, the leakage processing module 125 may be a first leakage processing module, and the one or more circuits may comprise a second leakage processing module 164. The processed filtered signal 131 output via the cable television downstream output port of the leakage processing module 125 is input to the second leakage processing module. The first leakage processing module operates in the analog domain, and the second leakage processing module operates in the digital domain.

The one or more circuits may comprise a MoCA Tx/Rx selection module 134 which is operable to process a MoCA composite signal 191 to separate transmit components of the MoCA composite signal from receive components of the MoCA composite signal 191. The MoCA signal 135 input to the MoCA port of the leakage cancellation module 125 is an output of the MoCA Tx/Rx selection module 134.

Other embodiments of the invention may provide a non-transitory machine-readable (e.g., computer-readable) medium and/or storage medium, having stored thereon, a machine code and/or a computer program having at least one code section executable by a machine and/or a computer, thereby causing the machine and/or computer to perform the steps as described herein for ban separation in multiband communication systems.

Accordingly, the present invention may be realized via one or more circuits. The present invention may be realized in a centralized fashion in at least one computing system, or in a distributed fashion where different elements are spread across several interconnected computing systems. Any kind of computing system or other apparatus adapted for carrying out the methods described herein is suited. A typical combination of hardware and software may be a general-purpose computing system with a program or other code that, when being loaded and executed, controls the computing system such that it carries out the methods described herein. Another typical implementation may comprise an application specific integrated circuit or chip.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A system comprising:
one or more circuits for use in a transceiver, wherein:
said one or more circuits comprise a filter and a leakage processing module;
said filter comprises a multiband port, a first-protocol port, a second-protocol upstream port, and a second-protocol downstream port;
said leakage processing module comprises a second-protocol downstream input port, a second-protocol downstream output port, a first-protocol port, and a second-protocol upstream port; and
said leakage processing module is operable to:
process a first-protocol signal received via said first-protocol port of said leakage processing module via a first impedance network to generate a first compensation signal;
process a second-protocol signal received via said second-protocol upstream port of said leakage processing module via a second impedance network to generate a second compensation signal;
process a filtered signal received from said second-protocol downstream port of said filter based at least in part on said first compensation signal and said second compensation signal;
subtract said first compensation signal from said signal received from said second-protocol downstream port;
subtract said second compensation signal from said signal received from said second-protocol downstream port; and
output said processed filtered signal via said second-protocol downstream output port of said leakage processing module.

2. The system of claim 1, wherein:
said first impedance network is configured based on a measured or estimated leakage between said first-protocol port of said filter and said second-protocol downstream port of said filter; and
said second impedance network is configured based on a measured or estimated leakage between said second-protocol upstream port of said filter and said second-protocol downstream port of said filter.

3. The system of claim 2, wherein said first impedance network and said second impedance network are configured dynamically while said transceiver is receiving second-protocol downstream signals and processing said received second-protocol downstream signals for output to a television or monitor.

4. The system of claim 2, wherein a transfer function of said first impedance network and a transfer function of said second impedance network are fixed.

5. The system of claim 1, wherein said one or more circuits are operable to:
digitize said first-protocol signal prior to said first-protocol signal being input to said first-protocol port of said leakage processing module;
digitize said second protocol upstream signal prior to said second protocol upstream signal being input to said second protocol upstream port of said leakage processing module.

6. The system of claim 1, wherein:
said leakage processing module is a first leakage processing module;
said one or more circuits comprise a second leakage processing module; and
said processed filtered signal output via said second-protocol downstream output port is input to said second leakage processing module.

7. The system of claim 6, wherein:
said first leakage processing module operates in the analog domain; and
said second leakage processing module operates in the digital domain.

8. The system of claim 1, wherein:
said one or more circuits comprise a first-protocol Tx/Rx selection module which is operable to process a first-protocol composite signal to separate transmit components of said first-protocol composite signal from receive components of said first-protocol composite signal; and
said first-protocol signal received via said first-protocol port of said leakage cancellation module is an output of said first-protocol Tx/Rx selection module.

9. The system of claim 1, wherein a protocol of said first-protocol signal is a Multimedia over Coaxial Alliance (MoCA) protocol and a protocol of said second-protocol signal is a cable television or Data Over Cable Service Interface Specification (DOCSIS) protocol.

10. The system of claim 1, wherein said filter is a triplexer.

11. A system comprising:
one or more circuits for use in a transceiver, wherein:
said one or more circuits comprise a filter and a leakage processing module;
said filter comprises a multiband port, a first-protocol port, and a second-protocol downstream port;
said leakage processing module comprises a second-protocol downstream input port, a second-protocol downstream output port, and a first-protocol port;
said leakage processing module is operable to:
process a first-protocol signal received via said first-protocol port of said leakage processing module via an impedance network to generate a compensation signal, wherein a transfer function of said impedance network approximates a leakage transfer function of said filter said and said processing said second-protocol signal comprises application of said transfer function to said first-protocol signal to generate said compensation signal;
process a filtered signal received from said second-protocol downstream port of said filter based at least in part on said compensation signal, said processing of said filtered signal comprising subtraction of said compensation signal from said filtered signal; and
output said processed filtered signal via said second-protocol downstream output port of said leakage processing module.

12. The system of claim 11, wherein:
said impedance network is configured based on a measured or estimated leakage between said first-protocol port of said filter and said second-protocol downstream port of said filter.

13. The system of claim 12, wherein said impedance network is dynamically configurable during reception of second-protocol downstream signals and processing of said received second-protocol downstream signals for output to a second-protocol or monitor.

14. The system of claim 12, wherein said transfer function of said impedance network is fixed.

15. The system of claim 11, wherein said one or more circuits are operable to digitize said first-protocol signal prior to said first-protocol signal being input to said first-protocol port of said leakage processing module.

16. The system of claim 11, wherein:
said leakage processing module is a first leakage processing module;
said one or more circuits comprise a second leakage processing module; and
said processed filtered signal output via said second-protocol downstream output port is input to said second leakage processing module.

17. The method of claim 1 wherein:
said processing said first-protocol signal comprises applying a first transfer function to said first-protocol signal, wherein said first transfer function approximates a first leakage transfer function of said filter.

18. The method of claim 17, wherein:
said processing of said second-protocol signal comprises application of a second transfer function to said second-protocol signal, wherein said second transfer function approximates a second leakage transfer function of said filter.

* * * * *